United States Patent [19]

Sakagami et al.

[11] Patent Number: 4,581,196
[45] Date of Patent: Apr. 8, 1986

[54] METHOD OF AND APPARATUS FOR CONTROLLING OUTPUT POWER OF NUCLEAR REACTOR

[75] Inventors: Masaharu Sakagami, Katsuta; Kazuo Hiramoto; Masahide Nakamura, both of Hitachi, all of Japan

[73] Assignee: Hitachi, Ltd., Tokyo, Japan

[21] Appl. No.: 526,783

[22] Filed: Aug. 26, 1983

[30] Foreign Application Priority Data

Aug. 27, 1982 [JP] Japan .................................. 57-147561

[51] Int. Cl.⁴ ............................................... G21C 7/36
[52] U.S. Cl. .................... 376/216; 376/217; 376/250
[58] Field of Search ............... 376/216, 217, 250, 251, 376/253

[56] References Cited

U.S. PATENT DOCUMENTS 4,302,287 11/1981 Hayashi .............................. 376/217
4,415,524 11/1983 Gross .................................. 376/216

FOREIGN PATENT DOCUMENTS 2753028  5/1979 Fed. Rep. of Germany ...... 376/217
54-155392 12/1979 Japan .................................. 376/217

Primary Examiner—Donald P. Walsh
Attorney, Agent, or Firm—Antonelli, Terry & Wands

[57] ABSTRACT

A method of controlling the output power of a nuclear reactor core in which an output power distribution in the core is controlled with the use of an output power controlling means for controlling control rods, a flow of coolant or a concentration of neutron absorbing substance. Core data is calculated to include an output power distribution and a burn-up degree distribution in a fuel assembly, in accordance with detected data of the controlling means. Fuel rod data, which includes a temperature distribution, a stress distribution, a strain distribution and a concentration of fission products in a fuel rod, is calculated in accordance with the core data. Then, a failure event probability in the fuel rod is calculated in accordance with fuel rod data, the failure event probability being correlated with the history of the fuel rod concerning stress corrosion, strain and fatigue of the fuel rod. The soundness of the fuel rod is determined by comparing the failure event probability with a set value. According to this method, it is possible to start up a nuclear reactor at a power increase rate while observing the soundness of the fuel rods.

5 Claims, 20 Drawing Figures

FIG. II

METHOD OF AND APPARATUS FOR CONTROLLING OUTPUT POWER OF NUCLEAR REACTOR

BACKGROUND OF THE INVENTION

The present invention broadly relates to a method of calculating failure event probability in fuel rods of nuclear reactors and, more particularly, to an apparatus for controlling the output power of the nuclear reactor equipped with a fuel rod soundness observation device which permits the control of operation of the nuclear reactor in accordance with the fuel rod failure event probability determined by the above-mentioned method.

During starting up of a nuclear reactor, the temperature of the fuel pellets in each fuel rod is raised so that the fuel pellets are thermally expanded to reduce the gap between the fuel pellets and the clad tube. As the linear power density in the fuel rod is increased beyond a predetermined value, the above-mentioned gap is reduced to zero, so that the mechanical interaction takes place between the clad tube and the fuel pellets to cause a stress and strain in the clad tube resulting, in some cases, a failure of the clad tube.

Various countermeasures have been taken up to now for preventing generation of excessive stress and strain in the clad tube of the fuel rod when the output power of the nuclear reactor is being increased. For instance, it has been proposed and actually adopted to control the operation of the control rods such that the output of the fuel rod does not exceed a predetermined threshold linear power. It has been attempted also to start up the nuclear reactor in such a way that, when a predetermined linear power of a fuel rod is exceeded, the flow rate of the coolant is controlled to increase the output power of the nuclear reactor at such a rate of increase of linear power as not to exceed a predetermined critical rate.

These known measures, however, encounter various problems as follows. For instance, there have been no means for offering information as to the level of the linear power of a fuel rod at which the failure of the fuel rod is caused during operation of a nuclear reactor, particularly in the course of the start up thereof. In addition, since the limit value of the rate of increase of linear power is selected to have a sufficient margin to ensure the safety, so that many days are required for starting up the nuclear reactor thereby to lower the rate of operation of the nuclear reactor.

In the starting up of a nuclear reactor, it is desirable to calculate the failure even as a probability in the fuel rod for the expected increment of the output power, and to determine the path of increase of the output power such that the failure even as a probability does not exceed a predetermined value. This starting method is preferred because it can ensure the behavior of the fuel rod at the safe side while maximizing the increment of the output power to permit an efficient operation of the nuclear reactor.

It has been proposed to use a POSHO (power shock) model in the calculation of the failure event probability. The POSHO model, which is referrred to also as EPRI model, is outlines in EPRIL NP-409.

This POSHO model is for calculating the failure event probability in fuel rods, through the evaluation of possibility of pellet-clad interaction (reeferred to as "PCI", hereinunder), taking into account various factors such as the thermal expansion, creep, welling and relocation of the fuel pellets, as well as thermal expansion and creep of the clad tube.

The determination of the failure event probability by POSHO model, however, is still unsatisfactory in that it takes into account only the case where the stress exceeding a threshold value is applied to the clad tube, in the evaluation of possibility of PCI. Namely, with this method, the nuclear reactor has to be operated at a power increment which is sufficiently smaller than the value obtained from the failure event probability to ensure safety, so that many days are required for the start up of the nuclear reactor.

SUMMARY OF THE INVENTION

Accordingly, it is a first object of the invention to provide a method of calculating the failure event probability in fuel rod more accurately through an improvement in the POSHO model.

It is a second object of the invention to provide a fuel rod soundness observing means capable of automatically determining the failure event probability in a fuel rod more accurately.

It is a third object of the invention to provide an apparatus for automatically controlling the output power of nuclear reactor in accordance with the output from the fuel rod soundness observing device in such a way as to minimize the time required for the start up of the unclear reactor.

The present inventors have made an intense study to seek conditions which should be taken into consideration in attaining a high precision of determination of the failure event probability in fuel rods, and found that the failure of the clad tube is caused on the following occasions.

(I) When the clad tube under presence of stress in excess of a predetermined critical level is subjected to a corrosive substance of a concentration exceeding a predetermined critical concentration.

(II) When a strain exceeding a predetermined critical level is caused in the clad tube.

(III) When the clad tube experiences a large number of cycles of stress change, i.e. repetitional and alternating application and release of external force, exceeding a predetermined critical value.

Regarding the condition (I) mentioned above, the length of time taken until the failure of the clad tube is shortened as the stress applied to the clad tube is increased and as the concentration of corrosive substance such as iodine becomes higher, as will be understood from FIG. 2.

An index representing the degree of such failure of the clad tube, referred to as "stress corrosion failure index" hereinunder, defined by the following formula (1).

$$f_1 = \Sigma \frac{\Delta t[\sigma, Cm]}{t_F[\sigma, Cm]} \quad (1)$$

In equation (1) above, $f_1$ represents the stress corrosion failure index, $\Delta t\,[\sigma, Cm]$ represents the time duration of the condition where the stress $\sigma$ resides in the clad tube and the concentration of the corrosive substance m on the clad tube surface is $Cm$, $t_F[\sigma, Cm]$ represents the time length taken until the failure of the clad tube occurs under the presence of the stress $\sigma$ and the corrosive substance concentration Cm, and Σ represents the sum of the time duration $\Delta_t[\sigma, Cm]$.

Any value of the stress corrosion failure index $f_1$ exceeding "1" means that the probability of failure in the clad tube is high, while the value of the index $f_1$ below 1 suggests that the probability of the failure is small. Taking into account the fluctuation of the experimental data concerning the length of time till the occurrence of the failure, the probability of the failure due to stress corrosion is given by the following formula (2).

$$A_1 = g_1(f_1) \qquad (2)$$

where, $g_1(f_1)$ represents a function which can be determined experimentally in accordance with the type of clad tube, as exemplarily shown in FIG. 3.

As will be seen from FIG. 4, the probability of failure in the clad tube is increased as the plastic strain in the clad tube is increased. A relationship as given by the following formula (3) exists between the probability of failure of the clad tube due to excessive strain (referred to as "excess-strain failure", hereinunder) and the plastic strain.

$$A_2 = g_2(\epsilon^{p_1}) \qquad (3)$$

where, $g_2(\epsilon^{p_1})$ represents the probability of failure of clad tube by a strain $\epsilon^{p_1}$, which can be determined experimentally.

Finally, in the condition (III) mentioned before, the number of the stress cycles experienced until the clad tube is broken in decreased as the stress applied to the clad tube is large, as will be seen from FIG. 5. An index representing the degree of failure of the clad tube due to stress cycle (referred to as "fatigue failure index", hereinunder) is given by the following formula (4).

$$f_3 = \Sigma \frac{n(\sigma)}{N_F(\sigma)} \qquad (4)$$

where, $f_3$ represents the fatigue failure index, $n(\sigma)$ represents the number of cycles of stress $\sigma$, $N_F(\sigma)$ represents the number of cycles of stress experienced until the clad tube is broken by cyclic application of the stress $\sigma$, and Σ represents the sum for the stress cycles.

A value of the fatigue failure index $f_3$ given by the formula (4) exceeding 1 suggests a high probability of failure of the clad tube, while the value of the index $f_3$ below 1 means that the probability of breakdown is small. Taking into account the fluctuation of the experimental data, the probability $A_3$ of the fatigue failure is given by the following formula (5).

$$A_3 = g_3(f_3) \qquad (5)$$

where, $g_3(f_3)$ represents a function which can be determined experimentally as shown exemplarily in FIG. 6.

An explanation will be made hereinunder as to how the failure event probability in fuel rod is calculated using the formulae (1) to (5).

With a given linear output of a fuel rod, the temperature distributions along the fuel pellet and the clad tube are determined by solving the equation of heat conduction for each of the fuel pellet and the clad tube. Then, the amounts of thermal expansion of the fuel pellet and the clad tube are determined. As the fuel rod is burned for a long period of time, fission products are accumulated in the fuel pellet as a result of fission of fissile nuclide in the fuel pellet, so that the fuel pellet makes a volumetric expansion. This phenomenon is generally referred to as "irradiation swelling of a fuel pellet. A relationship between the amount of the irradiation swelling and the burn-up degree has been obtained through experiments. A part of the fission product produced in the fuel pellet is discharged from the fuel pellet to increase the gas pressure in the fuel rod, while adversely affecting the heat transfer between the fuel pellet and the clad tube. The extent of the effect on the heat transfer is determined from an experimental measurement of the heat transfer from a gas.

When the burn-up degree is large while the linear power is high, the gap between the clad tube and the fuel pellet is reduced to zero to cause a mechanical interaction between the fuel pellet and the clad tube.

The level of the linear power at which the mechanical interaction is commenced is a function of the burn-up degree as shown in FIG. 7, and closely correlated with the history of the linear power level of the fuel rod. For informations, FIG. 7 shows linear power Pc of two fuel rods having different histories of linear power level. The clad tube will be stressed when this linear power Pc is exceeded in each of the fuel rods.

This stress can be determined by solving the equation of balance of force between the fuel pellet and the clad tube.

As will be seen from FIGS. 8 and 9, the plastic strain in the clad tube can be determined on the basis of the stress in the clad tube. Namely, the plastic strain is given as the sum of the plastic strain caused when the yield point is exceeded and the creep strain caused at a level below the yield point.

If the temperature, stress, plastic strain and the concentration of the corrosive substance are determined in the manner described, it is possible to work out the failure event probability A in accordance with the following formula (6), using the formulae (1) to (5) mentioned hereinbefore.

$$A = 1 - (1 - A_1)(1 - A_2)(1 - A_3) \qquad (6)$$

The failure event probability A in the fuel rod clad tube is determined as the function of the output power history and burn-up degree of the fuel rod. Using this probability A, it is possible to observe and judge the degree of failure, i.e. the soundness, of the fuel rod.

It is, therefore, possible to determine the allowable range of the power controlling operation through the control rod operation, coolant flow-rate control or control of the concentration of neutron absorbing substance, while observing the soundness of the fuel rods, by determining the failure event probability A for all of the fuel assemblies in the reactor core each assembly consisting of fuel rods having different output history and different burn-up degrees.

The invention will become more apparent from the following description of the preferred embodiment when the same is read in conjunction with the accompanying drawings.

DESCRIPTION OF THE PREFERRED EMBODIMENTS

Although various types of nuclear reactors are known and used, a boiling water reactor will be mentioned in the following description by way of example.

Figure 1:
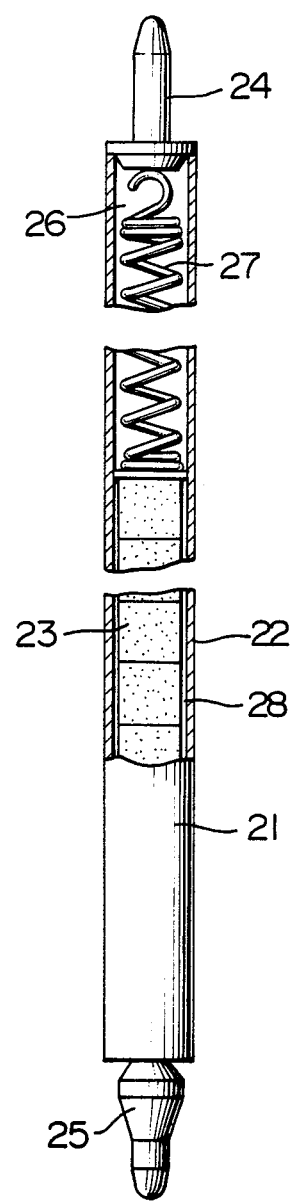
FIG. 1 is a vertical sectional view of a fuel rod.
Figure 2:
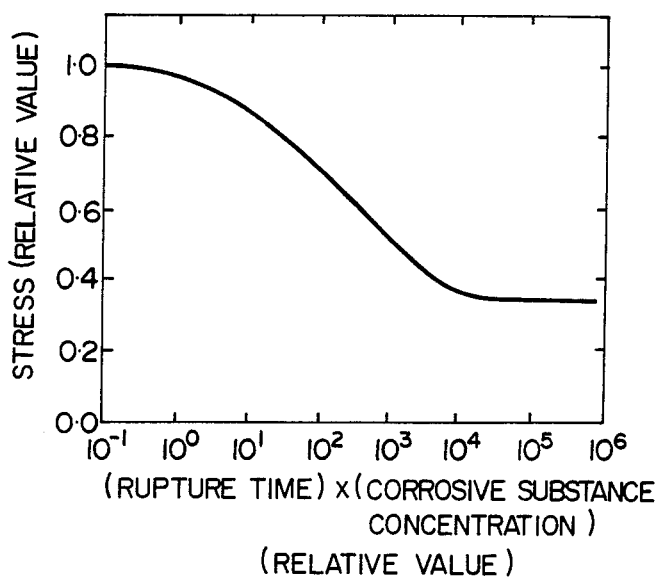
FIG. 2 is a diagram showing how the rupture time is related to stress and the concentration of corrosive substance which are factors affecting the stress corrosion failure.
Figure 3:
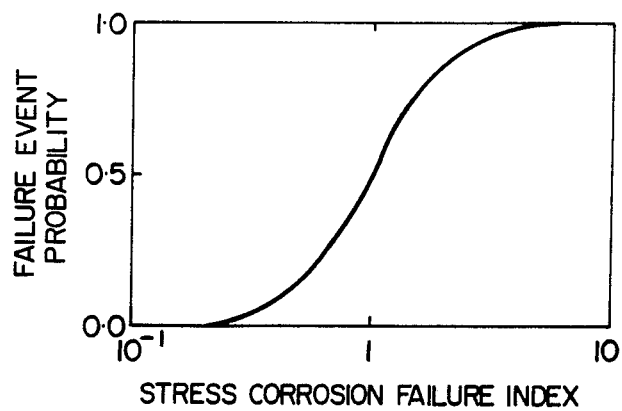
FIG. 3 is a diagram showing the relationship between the stress corrosion failure index and the stress corrosion failure probability.
Figure 4:
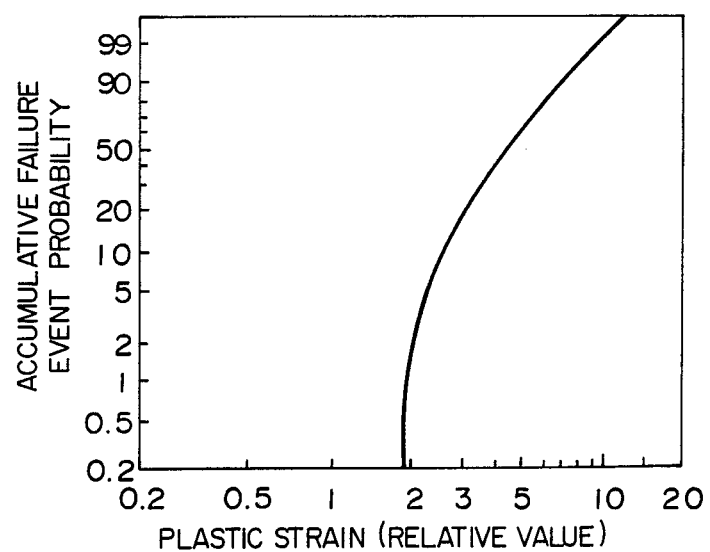
FIG. 4 is a diagram showing the relationship between the plastic strain and the accumulative failure probability.
Figure 5:
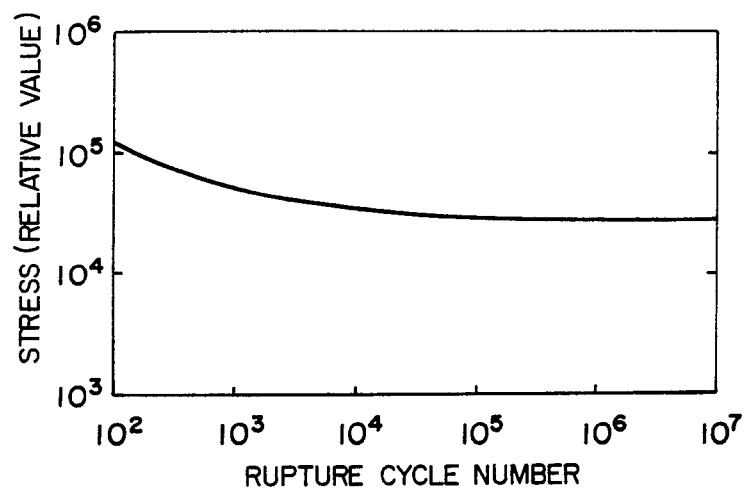
FIG. 5 is a diagram showing the relationship between the number of stress cycles before the rupture and the stress level which pertains to the fatigue failure.
Figure 6:
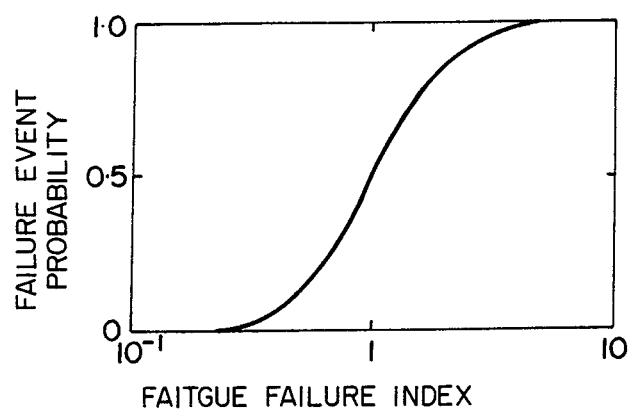
FIG. 6 is a diagram showing the relationship between the fatigue failure index and the fatigue failure probability.
Figure 7:
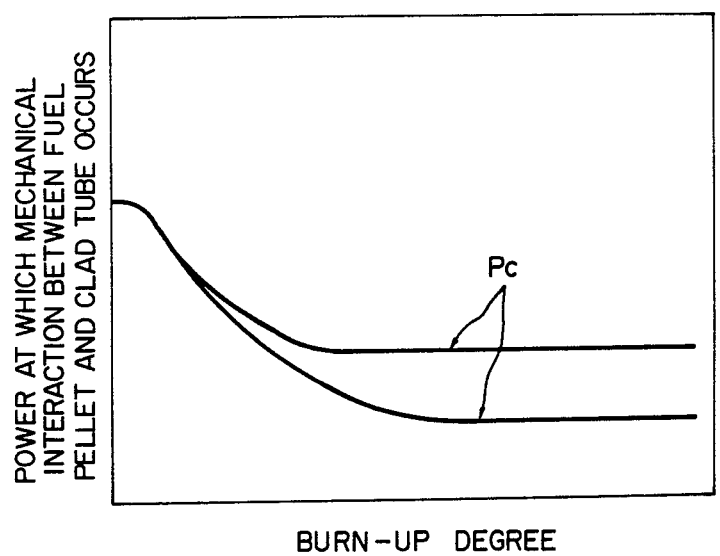
FIG. 7 is a diagram showing the relationship between the linear output at which the mechanical interaction beteen the fuel pellet and the clad tube is commenced and the burn-up degree.

FIG. 1 shows in section a known fuel rod incorporated in a nuclear reactor. As shown in this Figure, the fuel rod 21 has a multiplicity of fuel pellets 23 stacked in a clad tube 22 which is closed at its upper and lower ends by end plugs 24 and 25 welded thereto. A gas plenum 26 formed in the upper end portion of the fuel rod 21 is adapted to store gases produced as a result of a fission. A coiled spring 27 disposed in this gas plenum 26 is adapted to press the fuel pellet 23 from the upper side thereof.

During increasing of output power or start up of the nuclear reactor, an excessive stress or strain is caused in the clad tube 2 due to interaction between the fuel pellet and the clad tube 22, often resulting in a breakdown or failure of the clad tube 22. Namely, the temperature of the fuel pellet is raised as the output power of the nuclear reactor is increased, so that the gap 28 between the fuel pellet and the clad tube is decreased. Ths gap is completely eliminated when the linear output density of the fuel rod 21 reaches a certain level, so that a mechanical interaction is commenced between the fuel pellet 23 and the clad tube 22. Then, as the output power of the nuclear reactor is further increased, the mechanical interaction is enhanced to cause stress and strain in the clad tube 22 to damage the latter.

On the other hand, $UO_2$ in the fuel pellet 23 generates gases such as iodide gas through the reaction. These gases are not dispersed instantaneously in the gap 28 but temporarily stagnate in the local part of the gap to which they are relieved and are then gradually diffused into the whole gap. It is said that about 40 hours is required for the diffusion of these gases throughout the fuel rod.

Figure 19:
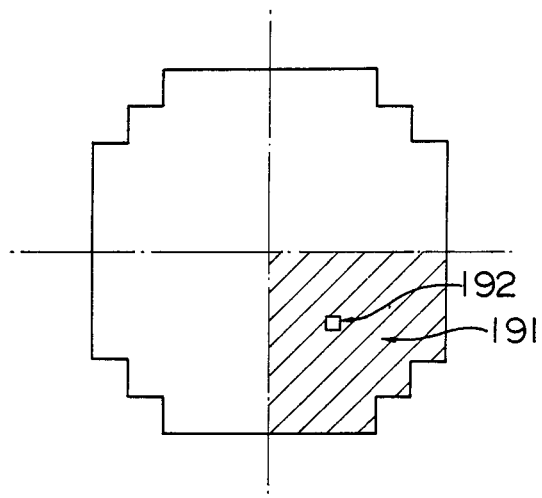
FIG. 19 is an illustration of the location in the nuclear reactor core of the fuel assembly used in the calculation of failure even as a probability.
Figure 20:
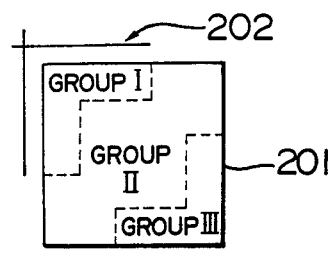
FIG. 20 is an illustration of the grouping of the fuel rods in the fuel assembly located at the position shown in FIG. 19, the fuel rods employed in the failure event probability being selected from the groups.

Referring to FIGS. 19 and 20, a representative fuel rod as used in the determination of fuel rod failure event probability is selected from each of three groups (1), (2) and (3) defined with regard to a control rod 202 in a fuel asembly 192 which is located in a quarter 191 of the reactor core (see FIG. 19). The grouping is made in accordance with the power distribution pattern in the channel box 201 of the fuel assembly.

More specifically, the power is expressed by the following formula of:

$$LHGR_g = P_{ijk}\, f_g \quad (g=1,2,3)$$

where, $LHGR_g$ represents the output of q, $P_{ijk}$ represents the mean power of a bundle and $f_g$ represents the power sharing factors in a bundle.

When the power of nuclear reactor is greatly increased from a low level, a stress exceeding the critical value is caused in the clad tube 22 of the fuel rod 21 and, if a corrosive substance in excess of the critical amount exists, a stress corrosion failure of the clad tube takes place. In addition, when the clad tube temperature is locally raised in a fuel rod 21 of high burn-up degree, a large strain in excess of a critical value is generated in the clad tube to cause a ductile failure. Furthermore, a fatigue failure of the clad tube will occur when the number of repetitional stress cycles, as a result of repetitional increase and decrease of the linear power, exceeds the critical value.

According to the invention, the probabilities of the stress corrosion failure, ductile failure and fatigue failure are determined in a manner which will be understood from the following description of the embodiment. In the determination of the probabilities, it is necessary to take into account the history of burn-up of the fuel rod 21.

The invention will be fully described hereinunder with reference to the accompanying drawings.

Figure 10:
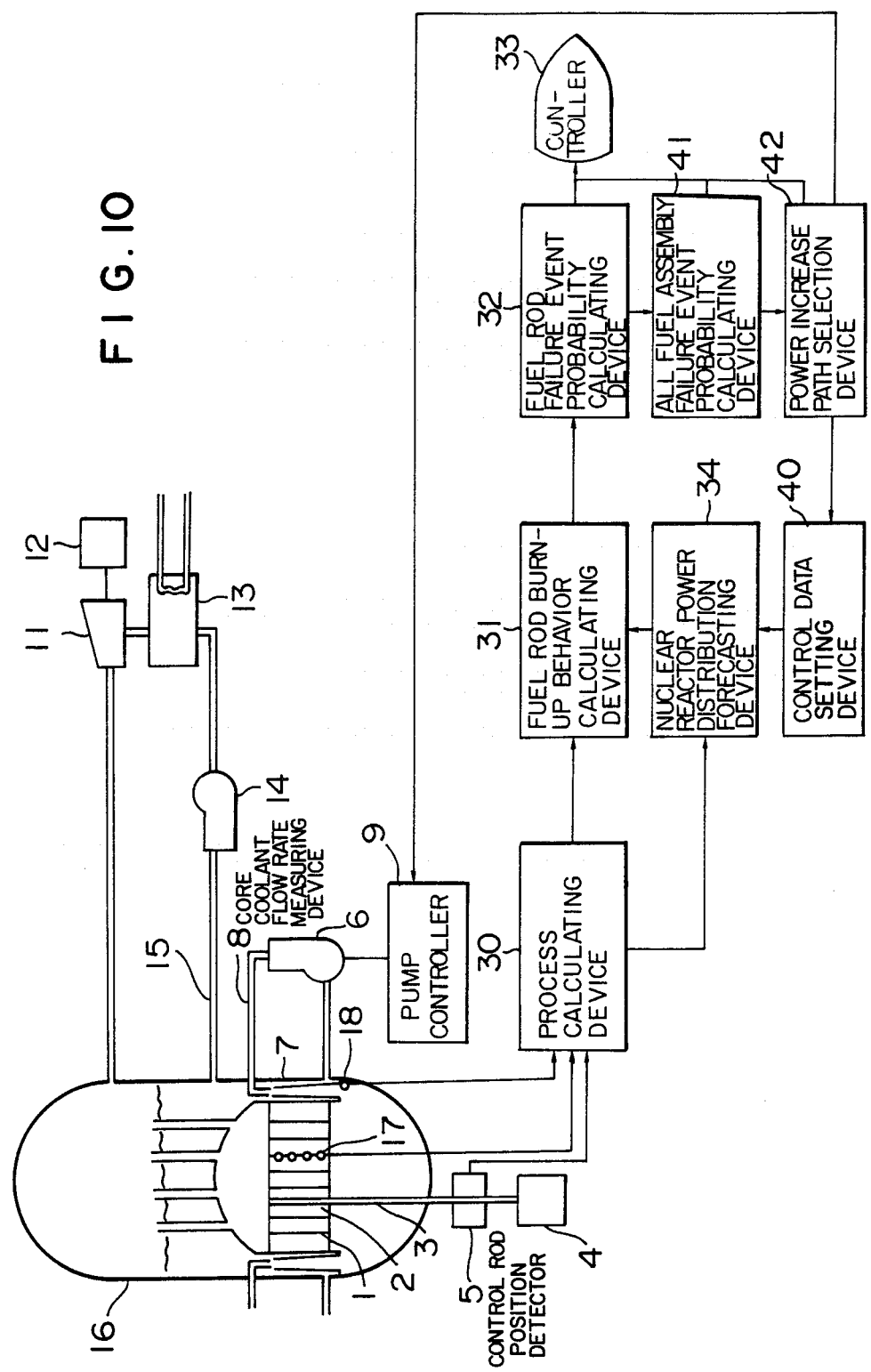
FIG. 10 is a block diagram of an embodiment of the apparatus in accordance with the invention.

FIG. 10 is a block diagram of a nuclear power plant having an embodiment of the output power controlling apparatus of the invention equipped with a fuel rod soundness observing device.

As will be seen from this Figure, the output power controlling apparatus has a control rod position detector 5 adapted to detect the depth of insertion of the control rod 3, a neutron flux detector 17 disposed in the reactor core 1 and a coolant flow rate measuring device 8 for measuring the flow rate of a coolant in the reactor core through sensing the pressure difference between the inlet and outlet of a jet pump 7. the outputs from these detectors 5, 17 and measuring device 8 are received by a process computer 30 as a core performance calculating means. The process computer 30 calculates, in accordance with the outputs from these detectors and measuring device, reactor core data such as output power distribution and burn-up degree distribution of the fuel assemblies 2 loaded in the nuclear reactor core 1, and delivers the thus calculated core data to a fuel rod burn-up behavior calculating device 31 and a reactor power distribution forecasting device 34.

The fuel rod burn-up behavior calculating device 31 is adapted to calculate various fuel rod data for each rod such as linear power, burn-up degree, temperature distribution, stress distribution, strain distribution and fission product concentration distribution. The thus calculated fuel rod data are delivered to a device 32 for calculating the failure event probability in fuel rod.

The fuel rod failure event probability calculating device 32 calculates the probability of failure event in each fuel rod 21, in accordance with the received data such as the burn-up degree, temperature distribution, stress distribution, strain distribution and fission product concentration distribution, and delivers the thus calculated probability to a display device 33 and also to a device 41 for calculating failure event pobability of all fuel assemblies. The display device 33 is composed of various means having functions of a typewriter and pattern display. The failure event probability calculating device 41 is adapted to calculate the failure event probability for all fuel assemblies in accordance with the inputted failure event probabilities for all fuel rods, and delivers the result of the calculation to a power-increase path determining device 42.

The power increase path determining device 42 compares the inputted failure event probability with a previously set value and, when this set value is exceeded, performs a correction of the data set in a control data setting device 40 so as to increase the time required for the increase of the power of the nuclear reactor. To the contrary, when the failure event probability is sufficiently smaller than the set value, the set value of the power-increasing time in the control data setting device 40 is decreased within a predetermined range. Thus, the power-increasing path determining device 42 is adapted to determine the power increasing time to optimize the rate of increase of the output power while maintaining the probability below a previously determined set value. On the other hand, the rate of increase of the coolant flow rate in the core is calculated by means of data forecast by the nuclear reactor power distribution forecasting device 34, and is sent to a recirculation pump controller 9.

The nuclear reactor power distribution forecasting device 34 forecasts the change in the core power distribution in response to the control data, e.g. amount of movement of the control rods or change in the coolant flow rate (or concentration of neutron absorbing substance) inputted from the control data setting device 40, making use of the aforementioned core data. The result of the forecasting delivered to the fuel rod burn-up behaviour calculating device 31 mentioned before.

The calculation of the failure event probability in the fuel rod 21 may be made at a predetermined time interval or may be made at any time as demanded by the operator.

Figure 11:
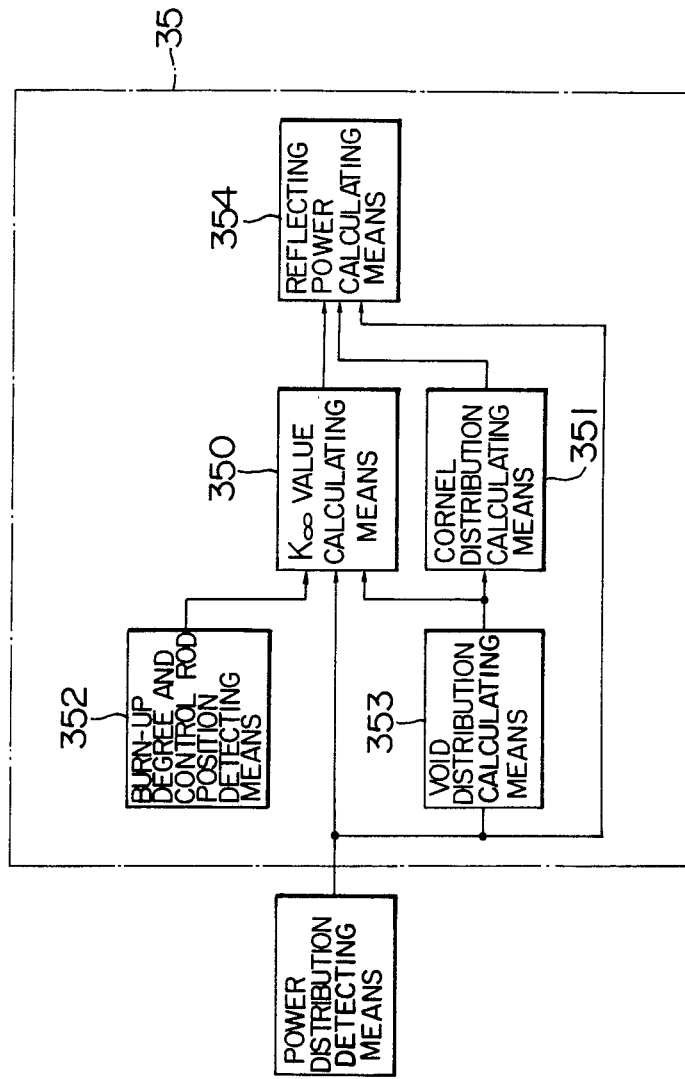
FIGS. 11 and 12 are block diagrams of essential parts of the embodiment shown in FIG. 10.
Figure 12:
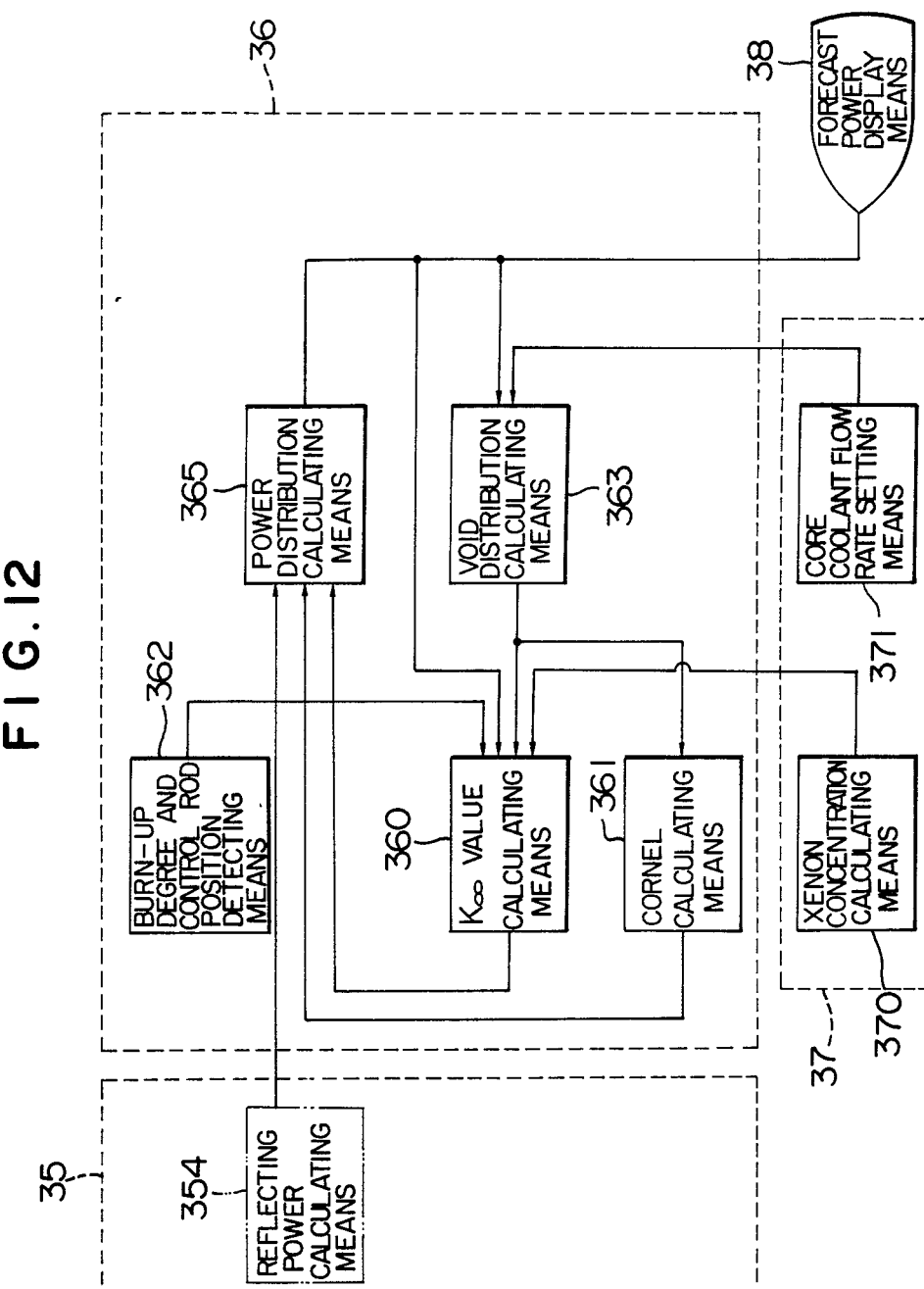

FIGS. 11 and 12 show the detail of the block diagram in the nuclear reactor power distribution forecasting device 34.

More specifically, FIG. 11 is a block diagram of a parameter setting device 35, in which a reference numeral 350 denotes a $K\cong$ value calculating means, 351 denotes a Colonel distribution calculating means, 352 denotes a burn-up degree and control rod position detecting means, 353 denotes a void distribution calculating means and 354 denotes a reflecting power calculating means.

The $K\infty$ value is determined by the power distribution, burn-up degree, constrol rod positon and the void distribution. On the other hand, the Colonel distribution is calculated from the void distribution. Provided that the power distribution, $K\cong$ value and the Colonel distribution are given, the power Pk at the heightwise node is determined by the following equation (7).

$$Pk = K\infty(W_{k-1}{}^v P_1 + W_{k+1}{}^v P_{k+1}) + [1 - 2W_k{}^v - 4(4 - 2_k)W_k{}^H]P_k \tag{7}$$

where, $K\infty k$ represents the neutron infinite multiplication factor at node K, $W_k{}^v$ represents the probability of absorption of the neutron at node K by the upper or lower adjacent node (Colonel), $W_k{}^H$ represents the probabiity of absorption of the neutron at node K by the nodes which are adjacent to the node K in the horizontal directions (Colonel) and $a_k$ represents neutron reflecting power at node K.

The reflecting power $2_k$ is determined by the following formula (8).

$$2_k = \frac{1}{W_k{}^H} \frac{1}{(P_K)} \left( \frac{P_k}{K\infty k} - W_{k-1}^v P_{k-1} - W_{k+1}^v P_{k+1} \right) - 1 + 2W_K^v + 4W_K^H \tag{8}$$

The reflecting power $a_k$ as the parameter of the model is determined by a series of calculation explained hereinabove, and this value $a_k$ is used in the next forecasting calculation.

FIG. 12 shows the block diagram of a power distribution forecasting calculating means 36 and a forecasting conditon appointing means 37. In this Figure, a reference numeral 360 denotes a $K\infty$ value distribution calculating means, 36 denotes a Colonel distribution calculating means, 352 denotes a burn-up degree and control rod position detecting means, 360 denotes a void distribution calculating means, 365, denotes a power distribution calculating means, 370 denotes xenon concentration calculating means and 371 denotes a core flow rate setting means. The power distribution calculating means calculates the power distribution Pk corresponding to the $K\infty$ value, Colonel and reflecting power which are given. The xenon concentration and the core flow rate in the reactor core to be forecast are given as outputs from the process calculating device, through the xenon concentration setting means 370 and the core flow rate calculating means 371 so as to be used in the calculation of the $K\infty$ value and the void distribution. Since the void distribution and the power distribution are affected by each other, the calculation of the power distribution and the calculation of the void distribution are repeated alternatingly until the forecast power distribution converges. The result of this calculation is delivered to the fuel rod burn-up behavior calculating device 31 mentioned before and is put on display in a forecast power distribution displaying means 38 through which the operator can know the forecast power distribution.

The principal operation of the embodiment described hereinbefore will be explained hereinunder with reference to the flow charts shown in FIGS. 13 to 15.

Figure 13:
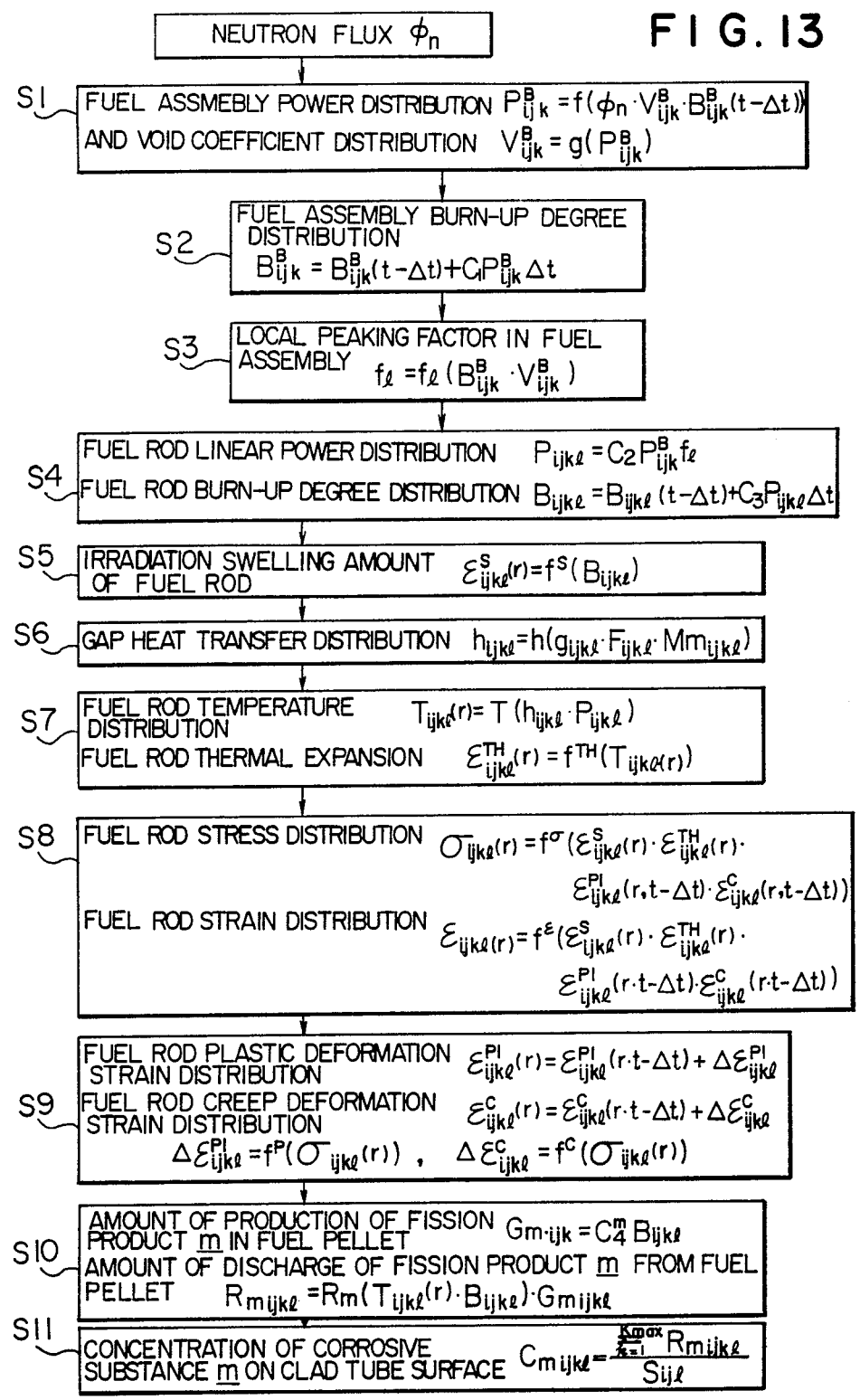
FIG. 13 is a flow chart showing an example of a calculation process performed by a fuel rod behavior calculating device.
Figure 14:
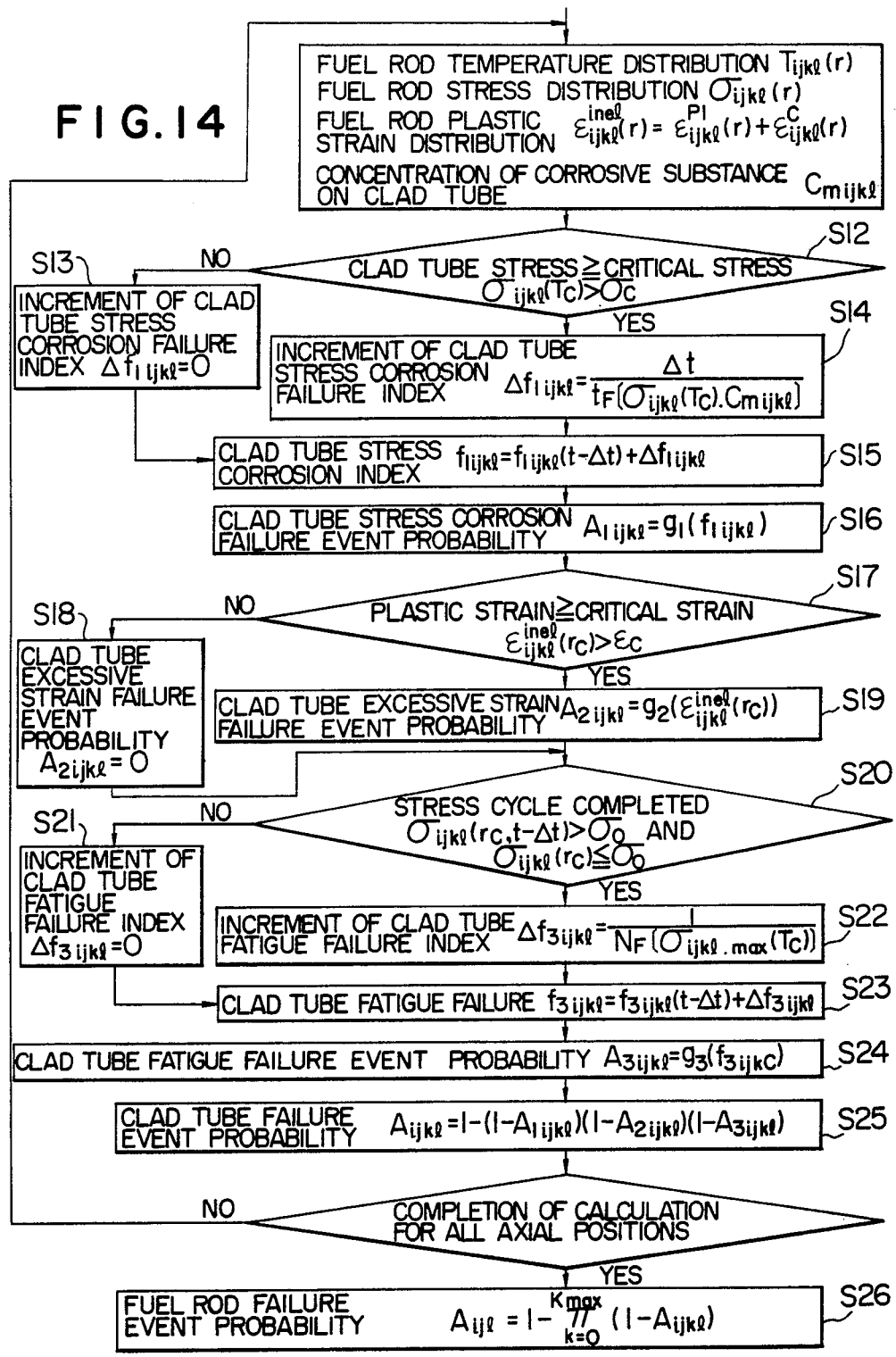
FIG. 14 is a flow chart of an example of the calculation process performed by a fuel rod failure event probability calculating device as shown in FIG. 10.

FIG. 13 shows a temperature distribution, stress distribution, strain distribution of the fuel rod and the concentration of the corrosive substance on the clad tube surface at the moment t, while FIG. 14 shows the flow chart of the process for the calculation of the failure event probability in the fuel rod. In these Figures, suffixes i and j represents the x and y coordinate values of the fuel assembly 2 with regard to the reactor core, k represents the coordinate value of the same in the axial directon, and l represents a coordinate for appointing the fuel rod 21 in the fuel assembly 2. An explanation will be made hereinunder as to how the failure event probability $A_{ijk}$ at moment t is calculated.

Figure 8:
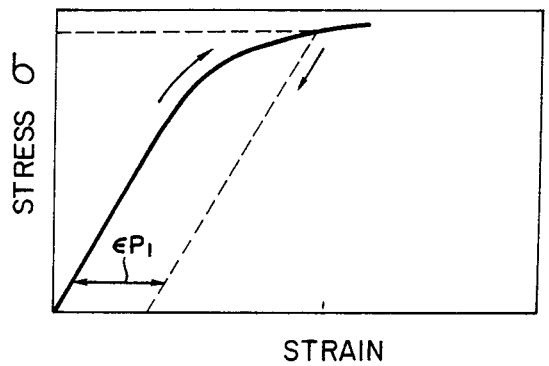
FIG. 8 is a diagram showing the relationship between the stress and strain.
Figure 9:
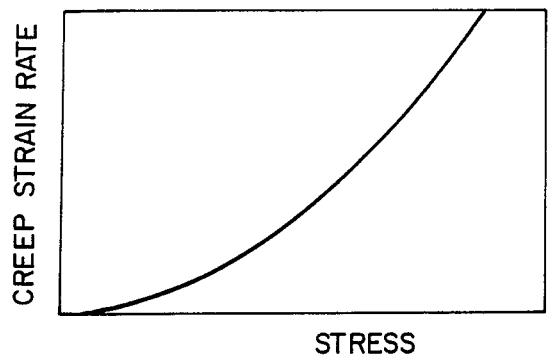
FIG. 9 is a diagram showing the relationship between the creep strain rate and the stress.

Using the neutron data detected by the neutron flux detector 17, the power distribution $V_{ijk}^B$ are determined through repetitional calculation in step S1. Then, in step S2, the burn-up degree distribution $B_{ijk}^B$ is determined by an incremental calculation. Subsequently, in step S3, the fuel rod power sharing rate $f_1$ in the fuel assembly 2 is calculated. In the next step S4, the linear output $P_{ijkl}$ of the fuel rod 21 is calculated as the product of the linear output of the fuel rod and the exchanging coefficient $C_2$, using the power distribution $P_{ijk}^B$, fuel rod power sharing ratio $f_1$ and the total power of the fuel assembly, and the burn-up degree distribution $B_{ijkl}$ of the fuel rod 21 is determined by an incremental calculation. In step S5, the irradiation swelling $\epsilon_{ijkl}^s(r)$ of the fuel pellet and clad tube are calculated using a correlation formula $f^s(Bijkl)$ of the fuel rod burn-up degree Bijkl which is obtained experimentally. In the next step S6, the heat transfer coefficient $h_{ijkl}$ in the gap between the fuel pellet and the clad tube is calculated by making use of a correlation formula concerning the gap size $g_{ijkl}'\psi o\nu\tau\alpha\psi\tau\ \rho\theta\epsilon\sigma\sigma\xi\theta\epsilon \leqq_{\iota=\kappa l}$ and the concentration $Mm_{ijkl}$ of the corrosive substance in the gap. In step S7, the temperature distributions $T_{ijkl(r)}$ of the fuel pellet and the clad tube are determined by solving the heat conduction equation for the fuel pellet and the clad tube, using the gap heat transfer coefficient $h_{ijkl}$ of the gap. In this step, calculation is made also to determine the thermal expansion amount $\leftarrow TH_{ijkl}(r)$ which is given by the temperature distribution $T_{ijkl}(r)$. The symbol r is used here to mean the radial position of the fuel pellet and the clad tube. In steps S8 and S9, repetitional calculations are made to determine the stress distribution $\sigma ijkl(r)$, strain distribution $\epsilon_{ijkl}(r)$, plastic deformation $\epsilon_{ijkl}^{Pl}(r)$ and the creep strain $\epsilon_{ijkl}^c(r)$, for both of the fuel pellet and the clad tube. Namely, by suitably supposing the stress distribution $\sigma'_{ijkl}(r)$ for the fuel pellet and the clad tube, the plastic deformation strain distribution $\epsilon_{ijkl}^{Pl}(r)$ and creep deformation strain distribution $\epsilon_{ijkl}^c(r)$ are determined for both of the fuel pellet and the clad tube, using the correlation formula between stress and strain (refer to FIG. 8 mentioned before) and correlation formula between stress and creep strain (refer to FIG. 9 mentioned before), which are obtained experimentally. Subsequently, the stress distribution $\sigma_{ijkl}(r)$ and strain distribution $\epsilon_{ijkl}(r)$ of each of the fuel pellet and the clad tube are calculated by solving a rigidity formula which represents the balance of force between the fuel pellet and the clad tube, using the thermal expansion amount $\epsilon_{ijkl}^{TH}(r)$, irradiation swelling amount $\epsilon_{ijkl}^s(r)$, plastic deformation stress distribution $\epsilon_{ijkl}^{Pl}(r)$ and the creep deformation strain distribution $\epsilon_{ijkl}^c(r)$ for each of the fuel pellet and the clad tube. Then, a judgement is made as to whether the thus obtained stress distribution $\sigma_{ijkl}(r)$ approximates the initially supposed stress distribution $\sigma'_{ijkl}(r)$. If not, the supposed stress distribution $\sigma'_{ijkl}(r)$ is changed and the plastic strain distribution $\epsilon_{ijkl}^{Pl}(r)$ and the creep strain distribution $\epsilon_{ijkl}(r)$ are calculated again. This interactive calculation is conducted until the calculated stress distribution $\sigma_{ijkl}(r)$ sufficiently approximates the supposed stress distribution $\sigma'_{ijkl}(r)$. In step S10, the amount $Gm_{ijkl}$ of generation of the fission product m in the fuel pellet is calcuated as the product of the burn-up degree $B_{ijkl}$ and the rate $C_4^m$ of generation by fission. At the same time, the amount $Rm_{ijkl}$ of the fission product m discharged from the fuel pellet into the fuel rod is calculated as the product of the amount $Gm_{ijkl}$ of generation of fission product m in the fuel pellet and the discharge ratio $Rm[T_{ijkl}(r)]$, $B_{ijkl}$ which is determined as a function of the fuel pellet temperature distribution $T_{ijkl}(r)$ and the burn-up degree distribution $B_{ijkl}$.

In step S11, the total amount of the corrosive substance m on the clad tube is divided by the total inner surface area $S_{ijl}$, to determine the concentration $Cm_{ijkl}$ of the corrosive material such as iodide out of the fission product discharged from the pellet, per unit area of the clad tube surface.

The calculations of the steps S1 to S10 are excuted for all of the axial nodes of the fuel rod. The calculation of the step S11 is conducted after the completion of the calculations of steps S1 to S10 for all of these axial nodes. In consequence, the temperature distribution $T_{ijkl}(r)$, stress distribution $\sigma_{ijkl}(r)$, plastic strain distribution $\epsilon_{ijkl}^{inel}(r)$ and the concentration $Cm_{ijkl}$ of corrosive material m on the clad tube surface are calculated for all of the axial nodes of each fuel rod.

Referring now to FIG. 14, in step S12, a judgement is made as to whether the stress in the clad tube has exceeded a critical stress $\sigma_c$ for the stress corrosion failure. If the critical stress $\sigma_c$ is exceeded by the clad tube stress $\sigma_{ijkl}(r_c)$, the increment $\Delta f_{1ijkl}$ of the stress corrosion failure index of clad tube for the time increment $\Delta t$ is calculated, by using the time increment $\Delta t$ and the time length $t_F[\sigma_{ijkl}(r_c)]$, $Cm_{ijkl}$ until the clad tube failure by corrosion, given as the function of the clad tube stress $\sigma_{ijkl}(r_c)$ and the concentration $Cm_{ijkl}$ of the corrosive substance on the clad tube. If the clad tube stress $\sigma_{ijkl}(r_c)$ is below the critical stress $\sigma_c$, step S13 is commenced by using "0" (zero) as the value of the increment $\Delta f_{1ijkl}$ of stress corrosion failure index for the clad tube. In step S15, the stress corrosion failure index of the clad tube at moment t is calculated by an incremental calculation. In step S16, the probability $A_{1ijkl}$ of stress corrosion failure of clad tube is calculated by means of a correlation formula which is determined as the function of the stress corrosion failure index $f_{1ijkl}$. Then, in step S17, a judgement is made as to whether the plastic strain of the clad tube has exceeded a critical strain $\epsilon_c$ for causing an excessive strain failure in the clad tube. If the critical strain is exceeded, the probability $A_{2ijkl}$ of excessive strain failure in clad tube is calculated in step 19, using a correlation formula which is determined as a function of the clad tube plastic strain $\epsilon_{ijk\text{-}l}^{inel}(r_c)$. If the clad tube plastic strain is below the critical strain $\epsilon_c$ the step S18 is executed using "0" (zero) as the value of the probability $A_{2ijkl}$ of excessive strain failure of clad tube. Step 20 is to perform a judgement as to whether a stress cycle, which includes an increase up to maximum value $\sigma_{ijkl}$, max($r_c$) of clad tube and decrease down to level below $\sigma_c$, has been completed. If this stress cycle has been completed, a calculation is made in step S22 to determine the increment $\Delta f_{3ijkl}$ of the fatigue failure index for clad tube in the time increment $\Delta t$, as the inverse value of the number $N_F[\Sigma_{ijkl}, \max(r_c)]$ of cycles until the clad tube failure occurs, determined as a function of the maximum stress $\sigma_{ijkl}$, max($r_c$) in the stress cycle applied to the clad tube. If the cycle of stress change in the clad tube has not been completed, the value of the increment of the fatigue failure index is selected to be "0" (zero). Then, in step S23, the fatigue failure index of clad tube at moment t is calculated by an incremental calculation. In step S24, the fatigue failure probability $A_{3ijkl}$ of the clad tube is determined by a correlation formula $g_3(f_{3ijkl})$ which is determined as function of the fatigue failure index $f_{3ijkl}$ of the clad tube. Subsequently, in step S25, the failure event probability $A_{ijkl}$ of clad tube at axial node K is calculated by means of the stress corrosion failure probability $A_{ijkl}$, excessive strain failure probability $A_{2ijkl}$ and the fatigue failure probabiilty $A_{3ijkl}$. The calculations of steps S12 to S25 are conducted for all of the axial nodes of the fuel rod. In step S26, the failure event probability $A_{ijkl}$ of fuel rod is calculated using the failure even as to probabilities $A_{ijkl}$ of all axial nodes.

The operation explained hereinbefore is conducted for all of the fuel assemblies in the reactor core. In order to minimize the operation time, however, it is advisable to select some representative fuel rods in each fuel assembly and to conduct the above-explained operation only for such representative fuel rods. The result of such operation can be used satisfactorily in the observation of soundness of the fuel rods.

An explanation will be made hereinunder with specific reference to FIGS. 15 and 16 as to the method of controlling the thermal power increase in the reactor core while observing the soundness of fuel rods using the failure probability as an index. The flow chart shown in FIG. 15 shows the procedure for the determination of the flow rate of coolant in the reactor core as a means for controlling the output power when a command power increment P is given. FIG. 16 shows the change in the output power from the nuclear reactor as a result of such a control.

Figure 15:
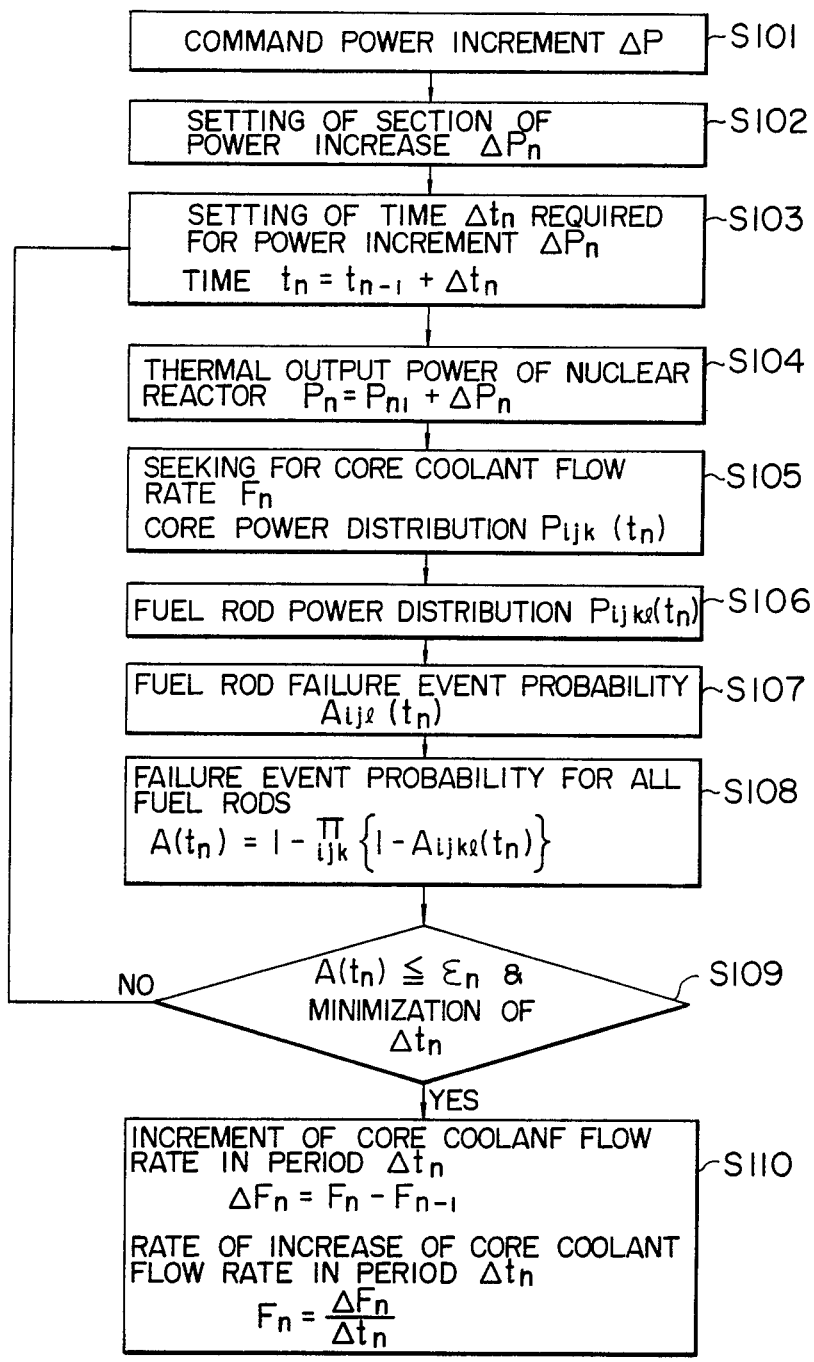
FIG. 15 is a flow chart showing an example of a process for determining the path of start up through a flow-rate control.
Figure 16:
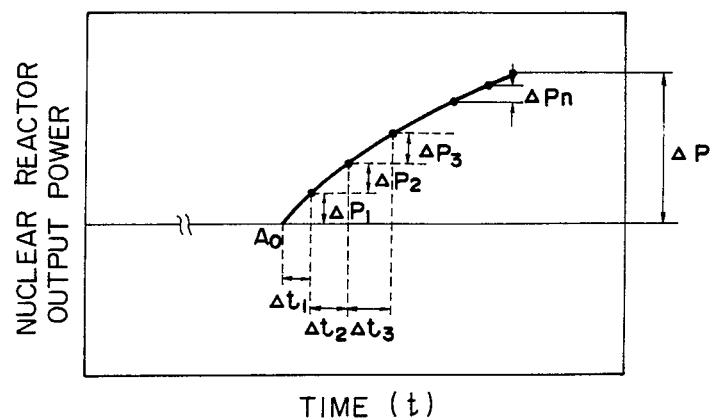
FIG. 16 is an illustration of sections of power increase or start up of a nuclear reactor.
Figure 17:
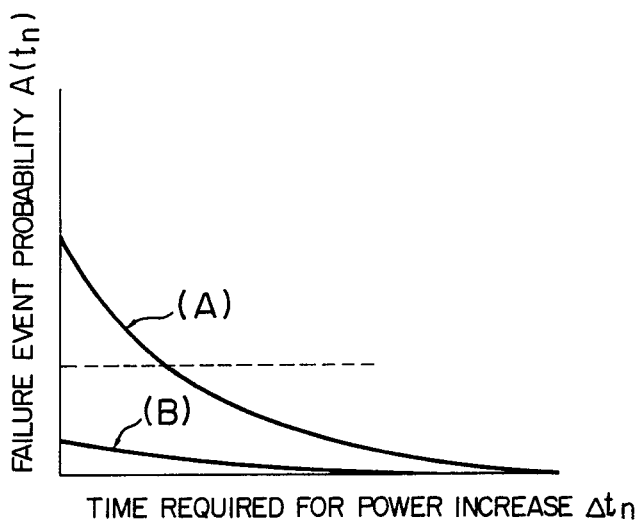
FIG. 17 is an illustration of the relationship between the rate of failure event in fuel rod and the time required for the start up of a nuclear reactor.

Referring now to FIG. 15, the command power increment $\Delta P$ is set in step S101. In step 102, the command power increment $\Delta P$ is sectioned into N pieces of sections Pn (n being 1 to N). Steps S103 to S110 are taken for determining the time $\Delta t_n$ and rate $F_n$ of increase of the coolant flow rate is the core required for attaining the power increment in the nth section of the command power increment. More specifically, in step S103, the time $\Delta t_n$ required for the power increment $\Delta P_n$ in the nth section is suitably selected. In step S104 the nuclear reactor output power $P_n$ at the final point of the nth section is set. In a subsequent step S105, the flow rate of coolant $F_n$ in the reactor core is calculated using the nuclear reactor power distribution forecasting device, for the nuclear reactor output power $P_n$ set in the step S104. In the step S104, a calculation is made also for determining the power distribution $P_{ijk}(t_n)$ in the reactor core. The power distribution $P_{ijkl}(t_n)$ of fuel rod and fuel rod failure event probability $A_{ijkl}(t_n)$ is calculated in steps S106 and S107. In step S108, the failure event probability $A(t_n)$ for all fuel rods loaded in the reactor core is calculated by making use of the failure event probability $A_{ijkl}(t_n)$ for each fuel rod. Then, a judgement is made in step 109 as to whether the probability $A(t_n)$ is smaller than a set value which is set beforehand for each section of the power increase. If the set value $\epsilon_n$ is exceeded by the calculated probability $A(t_n)$, the process is returned to step S103 in which the time increment $\Delta t_n$ is renewed and then the steps S104 to S109 are taken again. In general, there is a relationship as shown in FIG. 17 between the time $\Delta t_n$ required for the power increase and the failure event probability. Therefore, if the calculated probability $A(t_n)$ is greater than the set value $\epsilon_n$, the time $\Delta t_n$ is increased so that the calculated value of probability $A(t_n)$ can be reduced as compared with the value before the change of the time $\Delta t_n$. To the contrary, when the calculated probability $A(t_n)$ is sufficiently smaller than the set value $\epsilon_n$, the time $\Delta t_n$ is changed to a smaller value. By so doing, it is possible to obtain the minimum value of the time $\Delta t_n$ within an allowable range, while preventing the calculated probability $A(t_n)$ from exceeding the set value $\epsilon_n$. In step S110, the increment $\Delta F_n$ of the coolant in the reactor core within the period $\Delta t_n$ is calculated by means of the the time $\Delta t_n$ required for the power increase determined in step S109 and the forecast coolant flow rate $F_n$ obtained in the step S105. In the step S110, a calculation is made also to determine the rate $F_n$ of increase of the flow rate of the coolant in the reactor core within the period $\Delta t_n$.

Figure 18:
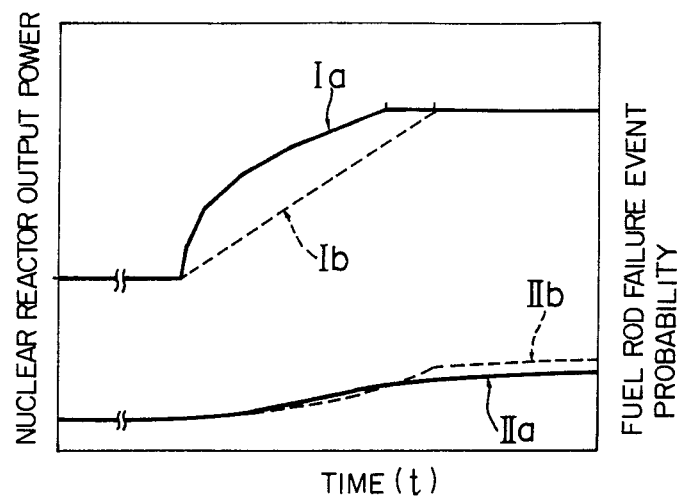
FIG. 18 is an illustration of the change in the output power of a nuclear reactor and the change in the failure event probability in the fuel rod.

By the output power control in accordance with the result of the operation described hereinbefore, it is possible to increase the output power of the nuclear reactor following up the solid-line curve Ia shown in FIG. 18. On the other hand, the failure event probability is increased in accordance with a solid-line curve IIa in the same Figure. By way of reference, broken-line curves Ib and IIb show the start up characteristics and the failure event probability characteristics as obtained when the nuclear reactor is started up in accordance with a conventional method in which the output power is increased at a constant rate.

From this Figure, it will be understood that, when the output power is still small, the rate of increase of the failure event probability in the fuel rod corresponding to the rate of the power increase is sufficiently small. It is, therefore, possible to maintain the failure event probability at a sufficiently small level even if the output power is increased rapidly, while the level of the output power is still small. On the other hand, after the output power has been increased to a high level, the rate of increase of the failure event probability is largely affected by the rate of the power increase. More specifically, the rate of increase of the failure event probability becomes greater as the rate of power increase gets larger. Thus, in the conventional method in which the output power is increased at a constant rate, the failure event probability is considerably large in the range of high output power. In contrast, according to the method of the invention, it is possible to increase the output power of the nuclear reactor up to the aimed power in a shorter period of time than in the conventional method, while maintaining the failure event probability in fuel rod at a level not greater than that in the conventional method.

Therefore, with the described method embodying the invention, it is possible to control the increse of the output power of the nuclear reactor while continuously watching the failure event probability related to the power histories and burn-up degrees of the fuel rods. This in turn permits such a control of the power increase that, while the output power level is still low, the output power is increased at a constant rate as in the conventional method and, in accordance with the increase of the output power, the rate of power increase is gradually decreased maintain the failure event probability at a sufficiently small level.

As has been described, according to the invention, it is possible to automatically minimize the time required for the start up of the nuclear reactor while observing the soundness of the fuel rods during the power increase. In consequence, the rate of operation of the nuclear reactor is increased advantageously without being accompanied by the fear of failure in the fuel rods.

We claim:

1. A method of controlling the output power of a nuclear reactor core in which an output power distribution in said core is controlled with the use of an output power controlling means for controlling control rods, a flow of coolant or a concentration of neutron absorbing substance, comprising the steps of:
    calculating core data including an output power distribution and a burn-up degree distribution in a fuel assembly in accordance with detected data of said controlling means;
    calculating fuel rod data including a temperature distribution, a stress distribution, a strain distribution and a concentration of fission products in a fuel rod, in accordance with said core data;
    calculating a failure event probability in said fuel rod in accordance with fuel rod data, said failure event probability being correlated with the history of said fuel rod concerning stress corrosion, strain and fatigue of said fuel rod; and
    determining the soundness of said fuel rod by comparing said failure event probability with a set value.

2. An apparatus for controlling the output power of a nuclear reactor core in which an output power distribution in said core is controlled with the use of an output power controlling means for controlling control rods, a flow of coolant or a concentration of neutron absorbing substance, including means for observing the soundness of said fuel rod, said soundness observing means comprising:
    a core performance calculating means for calculating core data including an output power distribution and a burn-up degree distribution in a fuel assembly in accordance with detected data of said controlling means;
    a fuel rod burn-up behavior calculating means calculating fuel rod data including a temperature distribution, a stress distribution, a strain distribution and a concentration of fission products in a fuel rod, in accordance with said core data;
    a failure event probability calculating means for calculating a failure event probability in said fuel rod in accordance with fuel rod data, said failure event probability being correlated with the history of said fuel rod concerning stress corrosion, strain and fatigue of said fuel rod; and
    means for determining the soundness of said fuel rod, by comparing said failure event probability with a set value.

3. An apparatus for controlling the output power of a nuclear reactor core in which an output power distribution in said core is controlled with the use of an output power controlling means for controlling control rods, a flow of coolant or a concentration of neutron absorbing substance, comprising:
    means for observing the soundness of said fuel rod, including a core performance calculating means for calculating core data including an output power distribution and a burn-up degree distribution in a fuel assembly in accordance with detected data of said controlling means,
    a fuel rod burn-up behavior calculating means for calculating fuel rod data including a temperature distribution, a stress distribution, a strain distribution and a concentration of fission products in a fuel rod, in accordance with said core data,
    a failure event probability calculating means for calculating a failure event probability in said fuel rod in accordance with fuel rod data, said failure event probability being correlated with the history of said fuel rod concerning stress corrosion, strain and fatigue of said fuel rod, and
    means for determining the soundness of said fuel rod, by comparing said failure even probability with a set value;
    an output power setting means adapted to vary the output increment in accordance with the command output power of said nuclear reactor and to set the control data for said output power controlling means;
    a nuclear reactor output power forecasting means adapted to calculate forecast core data in accordance with the set control data; and
    an output power correcting means adapted to correct said increment of said output power in such a manner that the increment of the forecast failure event probability calculated by said failure event probability calculating means from the forecast core data does not exceed a predetermined incremental value.

4. An apparatus for controlling the output power of a nuclear reactor according to claim 3, wherein said output power increment is sectioned into a plurality of sections, and said output power correction means is adapted to make a correction such that the increment of the forecast failure event probability determined for each section does not exceed said predetermined incremental value of fialure event probability determined beforehand for the same section.

5. An apparatus for controlling the output power of a nuclear reactor according to claim 4, wherein said output power correcting means is adapted to make the correction such that said increment of forecast failure event probability determined for each section approximates said predetermined increment value of failure event probability determined beforehand for the same section.

* * * * *